United States Patent [19]

Engström

[11] Patent Number: 5,147,536
[45] Date of Patent: Sep. 15, 1992

[54] ANION EXCHANGER WITH A LIGAND COMPRISING TWO QUATERNARY AMINO GROUPS AT A DISTANCE OF TWO ATOMS

[75] Inventor: Björn Engström, Sundsvall, Sweden

[73] Assignee: Pharmacia LKB Biotechnology AB, Uppsala, Sweden

[21] Appl. No.: 651,405

[22] Filed: Feb. 26, 1991

[30] Foreign Application Priority Data

Jun. 27, 1989 [SE] Sweden .......................... 8902315-4

[51] Int. Cl.$^5$ ............................................. B01D 15/08
[52] U.S. Cl. ................................... 210/198.2; 210/656
[58] Field of Search ................ 210/656, 198.2, 502.1, 210/638, 635, 198.3, 660, 679; 528/422

[56] References Cited

U.S. PATENT DOCUMENTS

4,298,500 11/1981 Abbott .............................. 210/198.3
4,980,067 12/1990 Hou et al. ........................... 210/638

FOREIGN PATENT DOCUMENTS

0167488 1/1986 European Pat. Off. .
0320472 6/1989 European Pat. Off. .
8904203 5/1989 World Int. Prop. O. .

OTHER PUBLICATIONS

Australian Official Journal of Patents, vol. 2, No. 13, Acceptance #: 571979 (Apr. 28, 1988).

Primary Examiner—Robert A. Dawson
Assistant Examiner—Sun Uk Kim
Attorney, Agent, or Firm—Fred Philpitt

[57] ABSTRACT

Anion exchangers for chromatographic separation, containing two positive charges at a distance of two atoms from each other. The invention comtemplates in particular anion exchangers containing two quaternary amino groups.

8 Claims, No Drawings

ANION EXCHANGER WITH A LIGAND COMPRISING TWO QUATERNARY AMINO GROUPS AT A DISTANCE OF TWO ATOMS

The present invention is concerned with the field of chromatographic separation and relates in particular to a novel type of anion exchangers containing two positive charges at a distance of two atoms from each other in a structure in which shielding of the charges is minimized. Ion exchangers especially contemplated are those containing two quaternary amino groups.

Ion exchange chromatography—a technique where a sample is made to pass through a matrix containing immobilized charged groups which will bind sample components of the opposite charge—is used inter alia for the separation of biomolecules such as for example proteins, peptides and nucleic acids. Although this is one of the oldest separation methods it continues to be one of the basic techniques for modern biochemical separation procedures. As far as anion exchangers are concerned, i.e. ion exchangers containing positively charged groups, the substances employed as such exchangers are in the first place amines attached to a solid phase of some kind or other in order to thus form either the charged groups themselves or groups chargeable in some particular environment. Primary, secondary and tertiary amine functions are classed as weak anion exchanger groups whereas quaternary amine functions are classed as strong anion exchanger groups. However, the use of these terms "weak" and "strong" does not reflect any qualitative assessment of the function of the ion exchanger; rather, it refers to the fact that a "strong" ion exchanger is charged over a broader pH range. In some practical applications, a weak ion exchanger is to be preferred over a strong one, and vice versa. As examples of anion exchangers that have been available commercially, for many years, may be mentioned DEAE Sephadex and QAE Sephadex (Pharmacia AB, Uppsala, Sweden) containing diethylaminoethyl and quaternary aminoethyl groups respectively as their functional groups. Ion exchangers containing amino groups are disclosed also in a great number of publications, see for instance WO89/04203 and EP167488.

In all forms of chromatographic separation techniques it is imperative that one should achieve the best possible separation/resolution of the sample components into either individual components or individual groups of components. Resolution is a function of i.a. the efficiency and selectivity of the column employed. These factors are determined in the first place by the properties of the separation matrix, in combination with the geometry of the column; so these factors constitute fixed parameters of the system. Other factors affecting resolution are for instance sample loading, flow rate, temperature, pH, gradients etc. which thus have to be optimized for any given column in each given separation situation. A trend during recent years has been that efforts should be made towards obtaining an increased efficiency and concomitantly an increased resolution by means of employing a column packing material of lesser particle size. On the other hand, it seems that very little work has been devoted to efforts aimed at improving the selectivity of the ion exchangers. One of the factors affecting selectivity is the structure of the charged group that has been attached to the matrix.

Another important property of ion exchangers is their ion exchange capacity; in case the mobile phase ions are small monovalent ions, this capacity is equal to the number of charges in the matrix. A small ion is capable of penetrating through the surface layer formed by the charged substituents and reaches for example also charges lying deeply in the interior of narrow pores. But when it comes to binding of biomolecules, the situation is different. What determines the amount of a protein that can be bound to an ion exchanger is not only the number of charges on the gel but also the manner in which the charges are exposed on the matrix surface, implying that the porosity of the matrix and the structure of the ion-exchanging group are of decisive importance. Of course also the charge properties of the protein will have an influence on the degree of binding. We have now found that the selectivity and capacity of strong anion exchangers may be improved considerably by means of introducing functional groups with charges arranged pairwise, these charges being located in a special structure in which they are exposed in an optimum manner to the ambient medium due to minimization of charge shielding.

The functional groups contemplated in accordance with the present invention have the structure

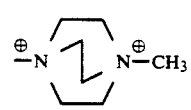  (1)

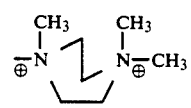  (2)

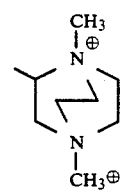  (3)

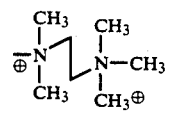  (4)

the characteristic feature here being that the two charged nitrogen atoms are located at a distance of two atoms from each other. In structures (1), (2), and (3) the nitrogen atoms moreover form part of a cyclic structure. By choosing structures (1) and (3) on ion exchangers one will minimize steric hindrance thwarting interaction with sample molecules in a solution contacting the ion exchanger.

As regards choosing the supportive matrix for binding of the functional group, this is an item which does not form part of the invention; a person skilled in the art can apply the inventive concept to the large number of supportive matrices that have been described for use in chromatographic separation procedures, and from among these he may choose one having desirable properties in respect of the other separation parameters. Examples of such matrices are inter alia gels of polysaccharides as for instance dextran, starch, cellulose and agarose, optionally after crosslinking for the purpose of increasing the rigidity of the material and thus improving its compressive and flow properties. Other examples are supportive matrices based on polystyrene-divinylbenzene, silica and acrylates.

Synthesis of ion exchangers according to the invention is carried out either by introducing reactive groups into the matrix chosen, said groups being reacted with either the ion exchanging group or a derivative thereof, or by causing a reactive derivative of the ion exchanging group to directly react with the matrix.

Coupling is performed with the aid of a so-called spacer, to be bound at one of its ends to the matrix and at the other end to the reagent that will produce one of the aforesaid structures (1)-(4). Such coupling of the spacer to the gel on one hand and to the reagent on the other hand is carried out by means of any of the numerous methods developed for couplings in this type of technological contexts, especially in the fields of affinity chromatography; examples of such methods are CNBr, epoxide, cyanate, hydrazide and sulfonyl coupling, to mention just a few out of a large number. The use of spacers for exposing functional groups on a matrix is likewise a very well-known method within this field of technology and does not form a part of the invention.

The structure preferred ar present is structure No. (1) which has given the best results in the experiments carried out up to now. Via the spacer one of the nitrogen atoms of the 1,4-diazobicyclo[2,2,2]octane (DABCO) molecule is coupled to the matrix and is thus quaternized, whereupon the other nitrogen atom is quaternized by being methylated. Alternatively, monomethylated DABCO is directly coupled via the spacer to the matrix.

The invention thus relates to an anion exchanger for chromatographic separation, said anion exchanger having the structure P—S—A 

where P is an insoluble support, preferably in the form of discrete particles such as e.g. spherical particles of the type as known within this technical field, having a particle diameter of for example 1 to 500 μm.

S is a so-called spacer, id est a molecule chain that does not interact with the sample molecules in any manner interfering with the separation procedure, but does promote exposure of the charged structure on the particle surface. If it is desired that for instance a certain amount of hydrophobic groupings are employed in the separation procedure, the spacer can of course be made hydrophobic in a known per se manner.

A is the charged ligand which contains two positively charged groups at a distance of two atoms from each other. Preferred are structures with two quaternary amino groups, especially the following:

(1)

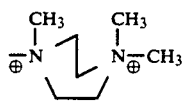

(2)

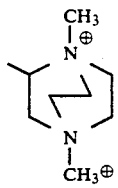

(3)

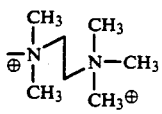

(4)

The invention is illustrated by way of the following non-limitative examples dealing with both the synthesis of ion exchangers and the use of these ion exchangers in chromatographic separation procedures.

WORKING EXAMPLES

I. Synthesis of ion exchanger on agarose matrix

I (a) Diamine coupling to agarose matrix, followed by quaternization step

Water (250 ml), sodium hydroxide in solid form (145 g), sodium sulfate (65 g) and sodium borohydride (2 g) were added with stirring to crosslinked agarose gel (500 ml swollen in water). The temperature was raised to 50° C. whereupon allyl glycidyl ether (700 ml) was added. The mixture was stirred overnight at 50° C. The gel was washed on a glass filter with water followed by ethanol and then finally again water. The then resultant gel was subjected to suction on a glass filter until the first crack became visible in the gel bed. Of this gel were then taken 100 g which together with sodium acetate (NaOAc.3H$_2$O, 3 g) were added to 50 ml water. Bromine was added until the color remained yellow, whereupon the bromine excess was eliminated by addition of sodium formate.

The amine chosen (0.2 mol) was added to the mixture, the synthesis then being allowed to proceed overnight at 45° C. The gel was washed with water, acetic acid/water, and then again water.

Thereafter the gel (25 g) was washed five times with 100 ml of ethanol and then five times with acetonitrile, whereupon it was transferred to 50 ml acetonitrile. The temperature was adjusted to 30° C. and methyl iodide (1 ml) was added.

After this the synthesis now involving quaternization of the second nitrogen was allowed to proceed overnight, the gel being thereafter washed with at first water, then ethanol and finally water.

I (b) Monomethylation of diamine followed by couplinq to agarose matrix

DABCO (56,1 g) was dissolved in acetonitrile (200 ml), whereupon methyl iodide (71 g) was added with stirring and at a rate such that the temperature did not exceed 35° C. (about 30 minutes). A precipitate was formed when the last drops of methyl iodide were being added. The reaction was allowed to proceed overnight at 30° C. The precipitate, consisting of dimethylated DABCO, was filtered off. The solvent was removed by distillation in a roller evaporator, and the residual crystal mass (146 g) was recrystallized from isopropanol (730 ml). The crystals were filtered off and dried in vacuo. The yield was 103.3 g and the melting point was within the range of 204° C.-208° C.

Monomethyl-DABCO, see above (6.06 g) was added to crosslinked agarose gel (15 ml) which had been allylated and brominated according to Example I (a). The reaction mixture was then left to stand at 30° C., its pH being maintained at 10.5 by means of a pH-stat. Thereafter the gel was washed with water followed by acetic acid/water and again water.

II. Coupling of monomethyl-DABCO (Me-DABCO) to polystyrene/divinylbenzene matrix Hydroxylated polystyrene/divinylbenzene gel (23 ml) was washed with a 10 % NaOH solution (175 ml) containing 0.03 % sodium borohydride. The gel was added to 9.2 ml of the alkaline solution, and allyl glycidyl ether (27.6 ml) was added. The mixture was stirred overnight at 45° C., whereupon the gel was washed, first with ethanol and then with water.

Bromine was added to the gel prepared as described above (10 g), water (6 ml) and sodium acetate (NaOAc.3H$_2$O, 0.38 g) until the color remained yellow. Excess bromine was eliminated by reaction with added solid sodium formate. Next monomethyl-DABCO (6.06 g) was added, and the mixture was stirred overnight at 30° C. under the control of a pH-stat set at pH 11.0. The gel was washed with water, then with acetic acid/water, and finally again water.

III. Synthesis of Me-DABCO ion exchanger on dextran-treated polystyrene/divinylbenzene matrix for the separation of DNA fragments

Allylation

Non-porous 3 μm hydroxylated polystyrene/divinylbenzene gel (15 g) was washed with filtered 10 % NaOH solution (114 ml) containing 0.03 % sodium borohydride. The gel was then added to the aforesaid alkaline solution; allyl glycidyl ether (36 ml) was added; and the mixture was stirred overnight at 45° C. The gel was then washed with water followed by ethanol and finally water.

Bromination and dextran coupling

The above allylated gel (3 g) was added to water (10 ml) together with sodium acetate (NaOAc.3H$_2$O, 0.1 g), whereupon bromine water was added, with stirring, until a stable yellow color was obtained. Excess bromine was removed with sodium formate, and the gel was then washed with water and subjected to suction on a glass filter until dry. Next, the gel was added to a solution of dextran having an average molecular weight of 20,000 (1.9 g) in water (5 ml), whereupon sodium hydroxide (0.34 g) and sodium borohydride (0.02 g) were added after one hour of stirring at 40° C. Thereafter the reaction mixture was left standing overnight at 40° C., with stirring. The gel was then washed with water.

Allylation of dextran-coupled gel

After dextran coupling the gel (3 g) was mixed with water (2.5 ml), sodium hydroxide (0.87 g), sodium sulfate (0.39 g) and sodium borohydride (0.01 g). Thereafter allyl glycidyl ehter (4.2 ml) at 50° C. was added with vigorous stirring. The reaction mixture was left standing overnight, whereupon the gel was washed first with ethanol and then with water.

Bromination and coupling of DABCO

Bromination was carried out as described above under the heading "Bromination and dextran coupling", and thereafter the gel (3 g) was added to water (2 ml); and DABCO (0.7 g) was added. After stirring overnight at 45° C. the gel was washed with water.

Methylation of DABCO-coupled gel

The above gel (3 g) was washed 3 times with ethanol and then 3 times with acetonitrile. It was then subjected to suction on a glass filter until dry. Thereafter the gel was added to acetonitrile (3 ml); methyl iodide (0.5 ml) was added at 30° C. and the mixture was then left standing at that temperature overnight. The gel thus obtained was washed once with acetonitrile, three times with ethanol, and then with water.

IV. Synthesis of ion exchanger with ligand 3 on agarose matrix

Crosslinked agarose gel was allylated according to Example 1. 50 g of allylated gel were washed with ethanol followed by acetone, and then finally benzene was washed into the gel. Then the gel was subjected to suction until dry and added to benzene (25 ml), whereupon bromine was added until a permanently yellow color was obtained. After 30 minutes, excess bromine was eliminated by being reacted with sodium formate which had been added in the form of a solution in water. The gel was washed with acetonitrile, subjected to suction until dry and slurried in acetonitrile (25 ml). Thereafter piperazine (8.6 g) was added and the mixture was left standing overnight at 50° C., with stirring. It was then washed with ethanol followed by water. Next, the gel was washed with 0.1 M sodium hydroxide (100 ml) and with water until the wash liquor was neutral. This was then followed by washing with ethanol and, finally, treatment with acetonitrile. After having been subjected to suction until dry the gel was slurried in acetonitrile (25 ml), and after addition of methyl iodide (4 ml) the mixture was stirred overnight at 30° C. The gel was washed with ethanol followed by water and was then ready for use.

V. Characterization of the selectivity of the ion exchangers

With a test mixture consisting of

| | |
|---|---|
| transferrin | 10 mg/ml |
| ovalbumin | 20 mg/ml |
| β-lactoglobulin | 20 mg/ml | the selectivity of the ion exchangers produced has been characterized by means of determining the difference in elution colume $V_e$ divided by the void volume $V_O$, $(V_{e,m} - V_{e,n})/V_O$; m and n represent sequential numerals assigned to peaks of the chromatogram.

| | |
|---|---|
| Column: | HR 10/10 (Pharmacia AB); volume 7.85 ml |
| Sample loading: | 0.31 mg protein/ml gel |
| Buffer A: | 20 mM piperazine pH 6.0 |
| Buffer B: | Buffer A + 0.6 M NaCl |
| Flow rate: | 100 cm/h |
| Gradient: | 0-75% buffer B/15 column volumes (120 ml) |

The test mixture listed above produces 5 peaks when eluted with a strong anion exchanger at pH 6.0. The mixture contains proteins of different sizes; and in reality the $V_O$ value is a different one for each of the different proteins, in as much as these would have been eluted at different volumes even if none of them were retarded by ion exchange interactions. This is a gel filtration phenomenon. However all the proteins would have been eluted within one column volume. In the test series, $V_O$ has not been corrected in respect of this effect because in comparisons made on the same supportive matrix the $V_O$ error is the same for each protein on the different ion exchangers. For the sake of simplicity, $V_O$ is taken to be the total volume of the column.

For comparison we are listing also the corresponding values obtained with the prior art ion exchangers Q Sepharose High Performance and Mono Q (Pharmacia LKB Biotechnology), these ion exchangers having the functional group:

(O)

Gel (0.3 ml, 30%) was filled into test tubes. Varying amounts of BSA solution (200 mg/ml) were added to the gel slurry, whereupon the volume was brought up to 0.4 ml by addition of buffer (20 mM Tris/HCl pH 7.5). The tubes were shaken for two hours, and then after centrifugation the absorbance at 280 nm was measured for determining the BSA concentration in the supernatant. The amount of bound protein was calculated as the difference between the total amount of added protein minus the amount in solution at equilibrium.

Results showed that the maximum uptake was 62.6 mg/ml with the prior art ligand (0) and was 86.3 mg/ml with ligand (1). It should be noted that in the case of (0) the number of ligands was 0.16 mmol/ml gel whereas in the case of (1) the number was 0.12 mmol/gel. Despite this fact the static protein binding capacity was 38% higher.

For a study of the dynamic protein binding capacity 1 g of gel was packed into each of two HR 5/5 columns (Pharmacia AB), whereupon the plate number was measured for the case of a 1% acetone solution as the sample, at a linear flow rate of 10 cm/hour. Protein

TABLE 1

Results from separations performed on agarose-based ion exchangers according to Example I.

| Ligand | Conc of ligand on gel mmol/ml gel | Capacity for Br⁻ mmol/ml | $(V_{e,m}-V_{e,n})/V_O$ | | | | |
|---|---|---|---|---|---|---|---|
| | | | m = 2, n = 1 | m = 3, n = 2 | m = 4, n = 3 | m = 5, n = 4 | m = 5, n = 1 |
| 0 | 0.16 | 0.16 | 1.71 | 0.88 | 1.34 | 1.66 | 5.59 |
| 1 | 0.10 | 0.20 | 2.18 | 1.64 | 2.42 | 2.05 | 8.29 |
| 2 | 0.12 | 0.24 | 2.05 | 1.53 | 2.38 | 1.97 | 7.93 |
| 3 | 0.04 | 0.08 | 2.46 | 0.91 | 0.88 | 1.38 | 5.62 |
| 4 | 0.12 | 0.24 | 1.93 | 1.24 | 2.16 | 1.76 | 7.09 |

TABLE 2

Results from separations performed on polystyrene/DVB-based ion exchangers

| Ligand | Conc of ligand on gel mmol/ml gel | Capacity for Br⁻ mmol/ml | $(V_{e,m} - V_{e,n})/V_O$ | | | | |
|---|---|---|---|---|---|---|---|
| | | | m = 2, n = 1 | m = 3, n = 2 | m = 4, n = 3 | m = 5, n = 4 | m = 5, n = 1 |
| 0 | 0.30 | 0.30 | 1.12 | 0.02 | 1.32 | 1.63 | 5.09 |
| 1 | 0.08 | 0.16 | 2.24 | 1.63 | 2.04 | 2.13 | 8.04 |

It will be seen from Tables 1 and 2 that the ion exchangers of the invention have a selectivity better than that of the prior art ion exchanger, and that the highest degree of selectivity is obtained with ligand (1).

In comparative tests analogous to those reported above the selectivity has been studied in structures where two quaternary nitrogen atoms are positioned at distances of three or more atoms from each other. Selectivity deteriorates with increasing distances between the nitrogen atoms; and moreover the results clearly indicate that the conformation of the molecules in ligands 1 and 2 will give properties that are optimal in our present context.

VI. Study of protein binding capacity

Measurement of the protein binding capacity of the most highly selective ligand (see above, ligand 1) was carried out on an agarose matrix and compared with the prior art ligand (0). Both the static and the dynamic capacities were measured—the former by way of recording adsorption isotherms for bovine serum albumin (BSA) and the latter by way of plotting curves of protein emergence in packed columns.

emergence curves were obtained by means of pumping through each column a solution of BSA (5 mg/ml in Tris/HCl, pH 7.5; 0.1 M NaCl) until protein emergence occurred.

Column efficiency was N =6370/m for (0) and N=6630/m for (1). In the case of (0) protein emergence was noted to occur when 5.8 ml of protein solution had been pumped through the column whereas in the case of (1) protein emergence occurred after 10.1 ml. This means that with the ligand according to this invention the dynamic capacity was 74% higher than with the prior art ligand. In this experiment again the ligand concentration relationship, 0.16 versus 0.12, had actually provided an advantage for the prior art gel. Despite this circumstance the capacity of the ion exchanger acording to the invention was markedly better.

VII. Study of peptide separation properties

Gels according to Example 1, that is, with agarose matrices, were packed into HR10/10 columns and tested with a 20 μl sample containing in each case 1 mg/ml of a micture of ACTH and the tetrapeptide Val-Gly-Asp-Glu. Buffer A: 20 mM Tris pH 7.1; buffer B: buffer A+0.1 M NaCl. Flow rate 1 ml/min.

Elution: Buffer A for 5 minutes, then linear gradient 0-40% B during a time span of 30 minutes.

Detection: UV 215 nm.

On the prior art ion exchanger (0) the peptides were eluted in the same peak when the mixture was applied to the column. The peptides separately gave the elution volumes of 24.4 and 24.8 ml respectively. When using the ion exchanger of the present invention, ligand (1), we obtained baseline separation; and when the peptides were run separately the elution volumes obtained in this case were 27.3 and 30.6 ml respectively.

VIII. Separation of DNA framgments

Ligand (1) was attached to a 3 μm non-porous polystyrene/DVB matrix (produced according to Example III) and packed into a 5×30 mm column, whereupon comparison was made with GenPak-FAX (Waters), a commercially available product developed especially for this type of separation. The sample was DNA from bacteriophage φX174 (Pharmacia LKB Biotechnology) treated with the restriction enzyme HaeIII (Pharmacia LKB Biotechnology). In the case of GenPak-FAX (P) the separation was carried out in conformity with the method recommended by the producer:

| Buffer A: | 20 mM Tris/HCl pH 8.5 |
|---|---|
| Buffer B: | A + 1.0 NaCl |
| Column: | 4.6 × 100 mm |

In the case of ligand (1) we used a 5×30 mm column and the following buffers:

| Buffer A: | 20 mM Tris/HCl pH 8.3 + 0.8 M NaCl |
|---|---|
| Buffer B: | 20 mM Tris/HCl pH 8.3 + 1.5 M NaCl |

It should be emphasized that the experimental conditions are not entirely comparable, but nevertheless it is worthwile noting that distinctly improved separation results were obtained with the ion exchanger (U) according to the invention, as compared to the prior art ion exchanger (P); this is evident from the below data which give the $(V_{e,m}-V_{e,n})/V_O$ values of both columns, with m and n being the sequential numerals of the peaks in the chromatogram.

| m = | 2 | 3 | 4 | 5 | 6 | 7 | 8 | 9 | 10 | 11 | 11 |
|---|---|---|---|---|---|---|---|---|---|---|---|
| n = | 1 | 2 | 3 | 4 | 5 | 6 | 7 | 8 | 9 | 10 | 1 |
| (P) | 1.4 | 1.1 | 0.5 | 0.2 | * | * | 1.0 | 0.1 | 0.1 | 0.1 | 4.6 |
| (U) | 9.0 | 5.9 | 2.6 | 1.2 | 0.5 | 1.0 | 4.2 | 1.4 | 0.7 | 0.7 | 27.2 |

* In the case of GenPack-Fax, peaks 6 and 7 were not separated.

I claim:

1. An ion exchanger for chromatographic separation, having the structure

P—S—A where
P is an insoluble support,
S is a spacer, and
A is a functional ligand that comprises two quaternary amino groups at a distance of two atoms from each other.

2. An ion exchanger according to claim 1 wherein the functional ligand A has one of the following structures:

(1)

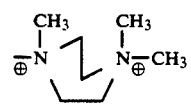

(2)

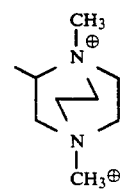

(3)

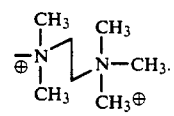

(4)

3. An ion exchanger according to claim 2 wherein the functional group A has the structure

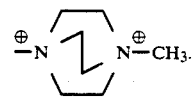

4. An ion exchanger according to claim 3 wherein the support consists of particles of cross linked agarose or of a polystyrene-divinyl-benzene matrix.

5. An ion exchanger according to claim 2 wherein the functional Group A has the structure

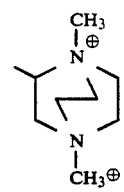

6. An ion exchanger according to claim 5 wherein the support consists of particles of cross linked agarose or of a polystyrene-divinyl-benzene matrix.

7. An ion exchanger according to claim 2 wherein the support consists of particles of cross linked agarose or of a polystyrene-vininyl-benzene matrix.

8. An ion exchanger according to claim 1 wherein the support consists of particles of cross linked agarose or of a polystyrene-divinyl-benzene matrix.

* * * * *